Patented July 29, 1952

2,605,208

UNITED STATES PATENT OFFICE 2,605,208

INSECT REPELLENTS

Paul D. Bartlett, Weston, Mass., and Hyp J. Dauben, Jr., Seattle, Wash., assignors to the United States of America as represented by the Secretary of the Army No Drawing. Application January 7, 1949, Serial No. 69,834

12 Claims. (Cl. 167—33)

This invention relates to insect repellents.

We have discovered that the application of certain N-acyl-substituted 1,2,3,4-tetrahydro-quinolines and 1,2,3,4-tetrahydro-quinaldines to the human skin or to a fabric effectively repels insects, particularly Aedes aegypti and Anopheles quadrimaculatus.

N - acyl-substituted 1,2,3,4 - tetrahydro-quinolines have the structural formula

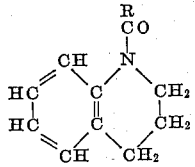

and the N-acyl-substituted 1,2,3,4-tetrahydro-quinaldines have the structural formula

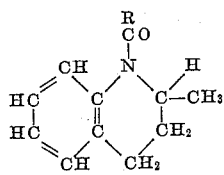

Tests to measure the repellency of the above-mentioned compounds against insects by skin application were conducted by smearing the compound on the arms of test personnel, who then thrust their arms into cages containing insects. The arms were exposed for 30-minute intervals at 3 minutes each until the first insect bite.

Tests to measure the repellency of fabrics impregnated with the above-mentioned compounds against insects were conducted by uniformly impregnating mercerized cotton hose with the compound at a rate equivalent to 3.3 gms. per sq. ft., drawing the dried hose over the arms of test personnel, who then thrust their covered arms into cages containing insects for 1 to 2 minutes.

Examples of N-acyl-substituted 1,2,3,4-tetrahydro-quinolines and quinaldines possessing insect repellent properties are illustrated in the following table, together with the results obtained by the above test methods against Aedes aegypti and Anopheles quadrimaculatus:

|  | Repellency on application to skin— | | Repellency of impregnated fabric against Aedes aegypti |
|---|---|---|---|
|  | Aedes aegypti | Anopheles quadrimaculatus |  |
|  | Mins. | Mins. |  |
| N-acetyl-1,2,3,4-tetrahydroquinoline | 269 | 42 | over 10 days. |
| N-propionyl-1,2,3,4-tetrahydroquinoline | over 60 |  | Do. |
| N-n-butyryl-1,2,3,4-tetrahydroquinoline | over 60 |  | Do. |
| N-propionyl-1,2,3,4-tetrahydroquinaldine | 230 | 47 | Do. |

For ease of application the substituted quinolines and quinaldines contemplated by the present invention may be incorporated in a suitable inert liquid or solid carrier such as mineral oil, alcohol, petrolatum, etc. For facile and uniform fabric impregnation, they may be applied an inert solvent, such as alcohol, ether, etc.

Having thus described our invention, we claim:

1. An insect repellent composition comprising a substance being a member of the group consisting of N-acyl-substituted 1,2,3,4-tetrahydro-quinoline and N-acyl-substituted 1,2,3,4-tetrahydro-quinaldine, the N-acyl-substituent of said substance having from 2 to 4 carbon atoms; and a non-toxic insect-repellent-adjuvant as a carrier therefor.

2. An insect repellent composition comprising an N-acyl-substituted 1,2,3,4-tetrahydro-quinoline, the N-acyl-substituent having from 2 to 4 carbon atoms, and a non-toxic insect-repellent-adjuvant as a carrier therefor.

3. An insect repellent composition comprising N - acetyl - 1,2,3,4 - tetrahydro - quinoline, and a non-toxic insect-repellent-adjuvant as a carrier therefor.

4. An insect repellent composition comprising N-propionyl-1,2,3,4-tetrahydro-quinoline, and a non-toxic insect-repellent-adjuvant as a carrier therefor.

5. An insect repellent composition comprising N-butyryl-1,2,3,4-tetrahydo-quinoline, and a non-toxic insect-repellent-adjuvant as a carrier therefor.

6. An insect repellent composition comprising N-propionyl-1,2,3,4-tetrahydro-quinaldine, and a non-toxic insect-repellent-adjuvant as a carrier therefor.

7. An insect repellent fabric comprising fabric impregnated with a substance selected from N-acyl-substituted 1,2,3,4-tetrahydro-quinoline and N-acyl-substituted 1,2,3,4-tetrahydro-quinaldine, the N-acyl-substituent of said substance having from 2 to 4 carbon atoms.

8. An insect repellent fabric comprising fabric impregnated with an N-acyl-substituted 1,2,3,4-tetrahydro-quinoline, the N-acyl-substituent having from 2 to 4 carbon atoms.

9. An insect repellent fabric comprising fabric impregnated with N-acetyl-1,2,3,4-tetrahydro-quinoline.

10. An insect repellent fabric comprising fabric impregnated with N-propionyl-1,2,3,4-tetrahydro-quinoline.

11. An insect repellent fabric comprising fabric impregnated with N-butyryl-1,2,3,4-tetrahydro-quinoline.

12. An insect repellent fabric comprising fabric impregnated with N-propionyl-1,2,3,4-tetrahydro-quinaldine.

PAUL D. BARTLETT.
HYP J. DAUBEN, Jr.

REFERENCES CITED

The following references are of record in the file of this patent:

UNITED STATES PATENTS

| Number | Name | Date |
| --- | --- | --- |
| 2,166,118 | Bousquet | July 18, 1939 |
| 2,166,120 | Bousquet | July 18, 1939 |
| 2,381,082 | Shinkle | Aug. 7, 1945 |
| 2,400,006 | Jones et al. | May 7, 1946 |
| 2,438,370 | Lewis | Mar. 23, 1948 |

FOREIGN PATENTS

| Number | Country | Date |
| --- | --- | --- |
| 503,507 | Great Britain | Apr. 4, 1939 |

OTHER REFERENCES

Heilbron, Dictionary of Organic Compounds, vol. III, page 703, entry 1:2:3:4-Tetrahydroquinoline, N-Benzoyl: plates from Et OH.M 76°.

Beilstein, Handbuch Der Organischen Chemie, Fourth edition, vol. 20, page 268, "N-Acetyl tetrahydrochinolin."

OSRD, Insect Control Committee Report No. 28, Interim Report No. O-94, May 18, 1945, page 13, 30, Dimethyl quinoline; page 42, O-10, 134, 1,2,3,4-tetrahydroquinoline, 167-OSRD.

Kozlov et al., Condensation of Acetylene, from 1936 Chemical Abstracts, volume 30, page 4864.

Troger et al., Reduction of . . . Derivatives, from 1926 Chemical Abstracts, volume 20, page 1626.